United States Patent [19]

Zawadzki et al.

[11] 4,062,930
[45] Dec. 13, 1977

[54] METHOD OF PRODUCTION OF ANHYDROUS HYDROGEN FLUORIDE

[76] Inventors: Bohdan Zawadzki, 30/2 Powstancow Wielkopolskich Str.; Anna Bulińska, 5/145 Winogrady Str., both of Poznan; Zenon Szulc, 52 Dzierzynskiego Str., Luboń; Ryszard Loński, 1/6 Wielkopolska Str.; Zbigniew Brzoskowski, 6/36 Matejki Str., both of Poznan, all of Poland

[21] Appl. No.: 669,661

[22] Filed: Mar. 23, 1976

Related U.S. Application Data

[63] Continuation of Ser. No. 458,399, April 5, 1974, abandoned.

[30] Foreign Application Priority Data

May 31, 1973 Poland .................................. 162978

[51] Int. Cl.² ................................................ C01B 7/22
[52] U.S. Cl. .................................... 423/483; 423/339; 423/341; 423/342; 423/467
[58] Field of Search ................ 423/483, 341, 342, 339, 423/484

[56] References Cited

U.S. PATENT DOCUMENTS

| | | | |
|---|---|---|---|
| 2,507,605 | 5/1950 | Lopker et al. | 423/483 |
| 2,588,786 | 3/1952 | Winter | 423/483 |
| 2,952,334 | 9/1960 | Provoost et al. | 423/483 |
| 2,975,034 | 3/1961 | Leech et al. | 423/483 X |
| 3,110,562 | 11/1963 | Hinkle, Jr. | 423/483 X |
| 3,199,952 | 8/1965 | Zanon et al. | 423/483 |
| 3,218,124 | 11/1965 | Oakley, Jr. et al. | 423/483 |
| 3,218,126 | 11/1965 | Wilkinson | 423/483 |
| 3,218,128 | 11/1965 | Klem | 423/483 |
| 3,218,129 | 11/1965 | Barker | 423/483 |

FOREIGN PATENT DOCUMENTS

| | | | |
|---|---|---|---|
| 448,662 | 5/1948 | Canada | 423/483 |
| 56,972 | 3/1969 | Poland | 423/483 |
| 289,383 | 7/1929 | United Kingdom | 423/483 |

*Primary Examiner*—Edward Stern

[57] ABSTRACT

Anhydrous hydrogen fluoride is produced from fluorosilicic acid by its decomposition with sulphuric acid in an improved process. Fluorosilicic acid of high concentration 40-50%, free of suspended silica is decomposed while being heated up to its boiling temperature with partial conversion into gaseous state. Earlier in the process evolved gaseous fluorine compounds which are desiccated by means of sulphuric acid and then separated by hydrogen fluoride absorption in a circulating liquid consisting of sulphuric acid and fluorosulphonic acid. Later hydrogen fluoride is distilled from this liquid and liquefied.

2 Claims, 1 Drawing Figure

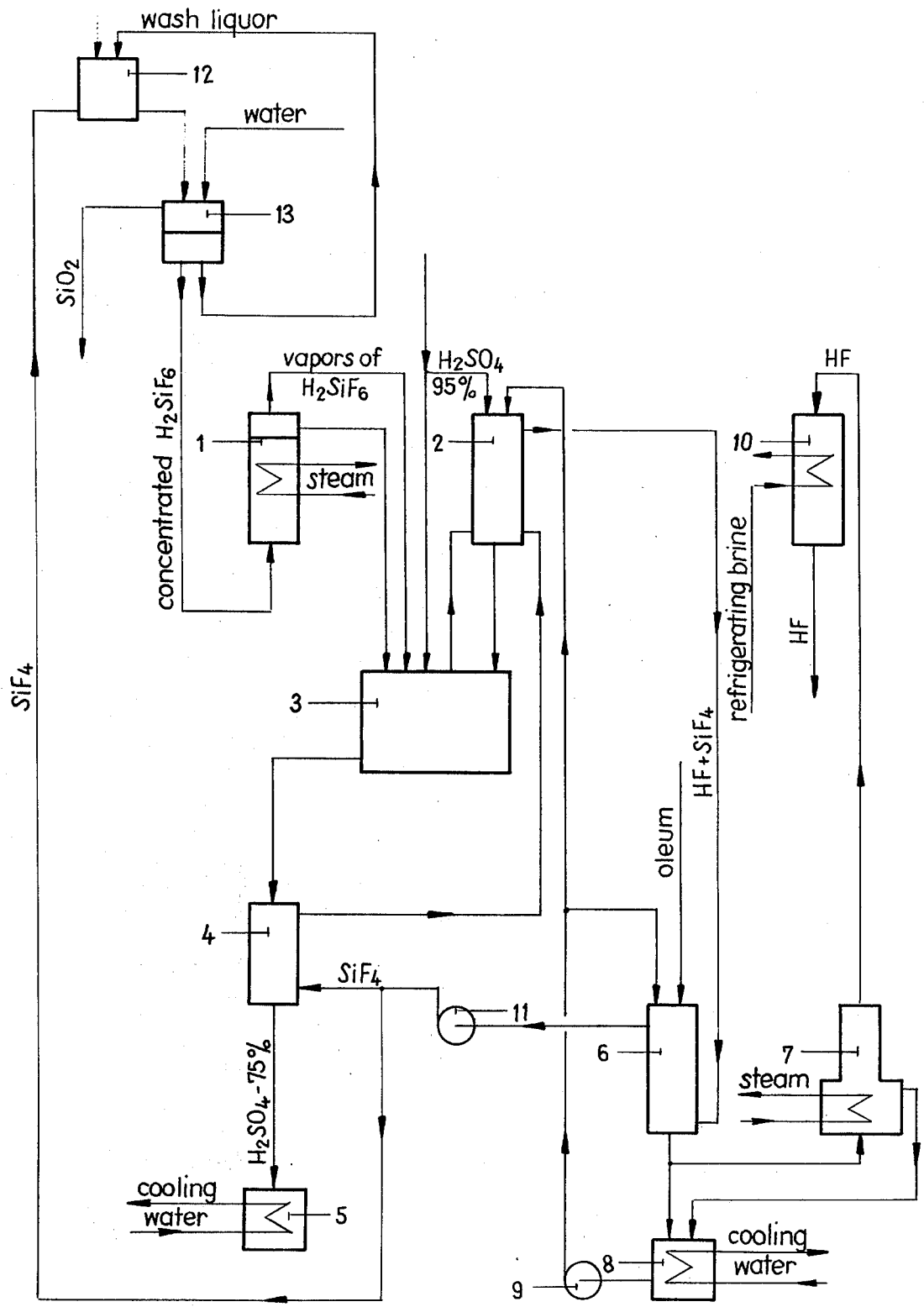

METHOD OF PRODUCTION OF ANHYDROUS HYDROGEN FLUORIDE

This is a continuation, of application Ser. No. 458,399 filed Apr. 5, 1974.

The invention relates to an improved method of production of anhydrous hydrogen fluoride from fluorosilic acid by decomposition with sulphuric acid.

The fluorosilicic acid starting material is usually obtained as a by-product of the production of phosphoric acid or phosphatic fertilizers, in the form of water solutions containing 10-20% of $H_2SiF_6$. The fluorosilicic acid in general contains silica suspension formed by hydrolysis of silicon tetrafluoride during the fertilizer production process.

$$3\ SiF_4 + 2\ H_2O \rightarrow 2\ H_2SiF_6 + SiO_2 \tag{1}$$

Part of this silica remains in solution in the form of dissolved silicic acid.

The fluorosilicic acid, when being treated with concentrated inorganic acids, e.g. sulphuric or phosphoric acid, is decomposed resulting in gaseous compounds of silicon tetrafluoride and hydrogen fluoride being evolved $$H_2SiF_6(aq) + H_2SO_4 \rightarrow H_2SO_4(aq) + 2\ HF_{(g)} + SiF_{4(g)} \tag{2}$$

When fluorosilicic acid contains silica, either in a suspended or dissolved form the silicon tetrafluoride ratio in the evolved gases is increased according to the following reaction $$4\ HF + SiO_2 \rightarrow SiF_{4(g)} + 2\ H_2O \tag{3}$$

The hydrogen fluoride or hydrofluoric acid production method based on fluorosilicic acid decomposition with sulphuric acid and subsequent separation of the products of such decomposition is known in the art. The decomposition rate and gaseous products desorption degree in this process depend upon the sulphuric acid concentration obtained after the reactants are mixed, and on the temperature. The silicon tetrafluoride is evolved to a much greater degree than hydrogen fluoride which is highly soluble in sulphuric acid, even at high temperatures.

The known hydrogen fluoride production method revealed in the prior art U.S. Pat. No. 3,257,167 involves decomposition of fluorosilicic acid in two stages, where at first, silicon tetrafluoride is liberated and finally hydrogen fluoride is expelled, either in vacuo, or by applying an additional extraction medium, e.g. with hexane. The product thus obtained contains only 73-78% HF, and is contaminated with sulphuric acid. According to another known method, described in Polish Patent No. 56,972, the fluorosilicic acid is decomposed with sulphuric acid and the hydrogen fluoride is isolated from the gases by absorption in oleum and hydrolysis of the fluorosulphonic acid formed thereby.

It is known for some time from these methods that a considerable amount of heat is required for decomposition of $H_2SiF_6$, and that under these conditions of desorption gases proceeds slowly. Stated another way, the temperature of the reacting mixture usually is too low and HF desorption is insufficient. The evolved gases also contain steam which is absorbed in oleum resulting in its excessive dilution and heating, which interferes with the HF absorption. The hydrolysis of fluorosulphonic acid formed runs slowly and also expulsion of hydrogen fluoride is insufficient.

The known methods also do not provide sufficient desorption of hydrogen fluoride thus requiring additional stages in the process for this purpose. Accordingly, the final hydrogen fluoride product is contaminated with considerable amounts of silicon tetrafluoride, water and sulphuric acid.

The object of the instant invention resides therefore in overcoming these disadvantages thought to be inherent in the process, and particularly to provide a method of processing of fluorosilicic acid into hydrogen fluoride in a continuous manner so as to yield anhydrous hydrogen fluoride of high purity.

According to the invention, fluorosilicic acid of relatively high concentration of 30%, preferably 40-50%, free of silica suspension, is introduced. The reason for use of such a high concentration is that, upon decomposition about 25% of the fluorine produced is evolved in a form of hydrogen fluoride and about 75% as silicon tetrafluoride. To change the entire amount of fluorosilicic acid into hydrogen fluoride the evolved silicon tetrafluoride would need to be absorbed and a three fold greater amount of $H_2SiF_6$ would be formed in a secondary process. The best way is to absorb the silicon tetrafluoride in fluorosilicic acid supplied as starting material for making the highly concentrated solution. Absorption in water would require additional consumption of sulphuric acid. The sulphuric acid of 93-98% concentration and fluorosilicic acid are mixed in ratios which ensures that a $H_2SO_4$ concentration of 72-78% is obtained after the reaction is completed.

$H_2SiF_6$ decomposition desorption of evolved gases stages are endothermic processes which consume a large amount of the heat energy liberated when the sulphuric acid is diluted with water contained in fluorosilicic acid. Because the speed and the extent of desorption of HF depend upon the temperature of the reacting system, it is necessary to supply this heat energy.

It has been discovered that a unique way to supply the required energy is to heat the fluorosilicic acid intended for decomposition up to its boiling state and to introduce the boiling liquid and its vapors into sulphuric acid. The reactants thus introduced consist substantially of silicon tetrafluoride and steam which liberate a considerable amount of heat when they are absorbed in sulphuric acid. In this manner the reaction mixture of acids may be easily heated up to 150°-170° C.

Desorption proceeds rapidly at these temperatures. The silicon tetrafluoride is entirely desorbed, while part of the hydrogen fluoride may still remain in the solution. For maximum evolution of HF the sulphuric acid, after desorption, may be additionally treated with silicon tetrafluoride. The silicon tetrafluoride for this purpose is available from a later stage in the process after the hydrogen fluoride has been removed from it. The sulphuric acid after desorption contains 0.1-0.15 F, mainly in the form of HF.

The evolution of the mixture of gases is accompanied by formation of a relatively large amount of steam, therefore the gases are predesiccated by means of sulphuric acid before carrying out the next stage in the process. For desiccation 30-40% of the total sulphuric acid content in the process is consumed. Sulfuric acid also is used for decomposition of $H_2SiF_6$. Complete desiccation of the gases is not recommended, because that would result in absorption of some portion of hydrogen fluoride and would increase its concentration in the acid remaining after distillation. The molar ratio of $H_2O:HF$ in the desiccated gases preferably is 0.1–0.3. The hydrogen fluoride is separated from the silicon tetrafluoride by absorption of the HF in a circulating liquid containing sulphuric and fluorosulphonic acids. The hydrogen fluoride dissolves in the concentrated sulphuric acid resulting in the formation of fluorosulphonic acid and water, as follows:

$$HF + H_2SO_4 \rightleftarrows HSO_3F + H_2O \qquad (4)$$

This reaction is a reversible one and the equilibrium depends on the temperature of the solution and its water content.

After the hydrogen fluoride absorption is complete, the remaining liquid, which contains about 10% F, is subjected to distillation by heating at 90°–110° C. The evolved hydrogen fluoride then is condensed and a product containing about 99.9% of HF is obtained.

The liquid remaining after distillation, which contains about 5% F, is cooled below 30° C and circulated for absorption of HF. The anhydrous hydrogen fluoride is distilled off from the absorbing system and the remaining moisture in the gases is also absorbed. The circulating liquid thereupon becomes diluted, resulting in a shift in equilibrium in the reaction (4) to the left. The molar ratio of absorbed water to sulphuric acid must be maintained in the range of 0.25–0.5.

The degree of hydration of the absorbing liquid is controlled by addition of oleum into the system and discharge of an equivalent amount of acids for the former operation i.e., - for gaseous desiccation. As much as 1–2 kg of oleum containing 20–25% of $SO_3$ is consumed per 1–2 kg of HF produced.

The silicon tetrafluoride which is free of hydrogen fluoride may be returned partially for treatment of the sulphuric acid after desorption.

The silicon tetrafluoride absorption is carried out in fluorosilicic acid. Highly concentrated solutions of this acid are obtained from which the precipitated silica is removed by filtration. The precipitate then is washed with water, and the washings are recycled for use as starting material. The clear concentrated fluorosilicic acid then is circulated for decomposition back to the beginning stage of the process.

The method according to the invention is illustrated by the following example, in which reference should be made to the flow sheet shown.

Concentrated fluorosilicic acid is supplied continuously to the heater 1, where it is heated to its boiling point and partially evaporated. The boiling acid and its vapors are transported into reactor 3 which is also continuously supplied with sulphuric acid having a concentration of about 95%. Part of the acid also is introduced through the desiccating column 2. The liquids are mixed in reactor 3. In addition, steam is absorbed from vapors coming from heater 1. The reacting temperature within the reactor is 150°–170° C. Under such conditions $H_2SiF_6$ is decomposed within a short time, and the decomposition products are intensively desorbed. The evolved gases are fed into the desiccating column 2. The sulphuric acid from the reactor flows off into the desorption column 4. This acid still may still contain some amount of hydrogen fluoride, so counterblowing with silicon tetrafluoride is applied. The gases from desorption column 4 are joined with gases of reactor 3 in desiccating column 2. After desorption, sulphuric acid having a concentration of about 75% is directed into tank 5 which is provided with water coolers.

The gases after preliminary desiccation are introduced into the absorption column 6 in which the hydrogen fluoride is absorbed. Column 6 is sprayed with a circulating mixture of sulphuric and fluorosulphonic acids supplied by pump 9. In addition column 6 is supplied with oleum in an amount needed to maintain the preset level of hydration. Simultaneously an equivalent amount of circulating liquid is removed from the closed cycle system by pump 9 and conveyed into the desiccating column 2. Some part of the liquid flows from column 6 into the distillation column 7 and another part into the circulating liquid tank 8. The liquid in distillation column 7 is heated up to 90°–110° C resulting in the absorbed hydrogen fluoride being distilled off, the distillate is led into the condenser 10 which is cooled with refrigerating brine, from which liquified HF is obtained as a final product. The liquid after distillation flows down from column 7 into the circulating tank 8 which is cooled to a temperature below 30° C. The silicon tetrafluoride escaping from the absorbing column 6 is circulated by means of fan 11 into the absorber 12 and partially fed back in the desorption column 4. The absorber 12 is supplied with diluted fluorosilicic acid and with washings after the silica precipitate treatment. After absorption of silicon tetrafluoride, a solution of concentrated fluorosilicic acid is obtained, which is conveyed into the filtering device 13 to separate the silica suspension. The separated silica is washed with water and discharged as a waste product. The washings are returned into the absorber 12, while the concentrated and filtered fluorosilicic acid is fed into the heater 1.

A specific example of hydrogen fluoride production according to the invention is illustrated below:

Hydrogen fluoride is produced in this embodiment from fluorosilicic acid having a 18% concentration which is consumed at a rate of 300 kg/hr. In the decomposition step, a solution of fluorosilicic acid containing 43.2% of $H_2SiF_6$ and 2.4% of $SiO_2$ is supplied at a rate of 500 kg/hr. sulfuric acid containing 95% of $H_2SO_4$ is supplied at a rate of 1000 kg/hr. of which 300 kg/hr. is introduced through the column for gaseous desiccation. 22% oleum is introduced into the hydrogen fluoride absorption circulating system at a rate of 60 kg/hr., and an equivalent amount of sulphuric acid is removed. After decomposition 1340 kg/hr. of sulphuric acid containing 75.5% $H_2SO_4$ and 0.15% HF is obtained. In the process 40 kg/hr., of hydrogen fluoride is absorbed, expelled and liquified.

The product contains 99.0% HF, 0.02% $H_2SO_4$, 0.04% $H_2O$ and 0.03% $SiF_4$. The silicon tetrafluoride is absorbed in 18% fluorosilicic acid resulting in a solution having a concentration of 43.2% which, after silica had been removed, is recycled, for further decomposition with sulphuric acid.

We claim

1. An improved process of producing anhydrous hydrogen fluoride from a fluorosilicic acid solution by dehydration and decomposition of said acid with sulphuric acid, which comprises the steps of:
   a. heating an aqueous fluorosilicic acid solution free of silica suspension and having a concentration of 30 to 50% to the boiling point and partially evaporating said solution,
   b. conveying the boiling fluorosilicic acid solution and its vapors into a closed reactor, containing sulphuric acid in such an amount that the concentration of sulphuric acid after the reaction will be 72-78%, c. decomposing said fluorosilicic acid in said reactor at 150°-170° C to form steam, gaseous hydrogen fluoride and silicon tetrafluoride and a solution of 72-78% sulphuric acid, which may contain residual hydrogen fluoride, d. passing gaseous silicon tetrafluoride through the sulphuric acid solution from step (c) to effect the liberation of any residual hydrogen fluoride from said solution, e. withdrawing a gaseous stream comprising steam, hydrogen fluoride and silicon tetrafluoride from said closed reactor in step (c) and mixing with the liberated hydrogen fluoride from step (d), partially drying said gaseous stream with sulphuric acid, and then introducing said sulphuric acid into said closed reactor of step (c), f. absorbing hydrogen fluoride from said partially dried gaseous stream from step (e) in sulphuric acid solution resulting in the formation of fluosulphonic acid and water and a partially dried gaseous stream containing silicon tetrafluoride, g. distilling and condensing hydrogen fluoride from the sulphuric acid solution of step (f) to obtain a product containing about 99.9% HF, h. returning the acid solution after distillation in step (g) for absorption of hydrogen fluoride in step (f) while maintaining the concentration of sulphuric acid in said solution by addition of oleum in step (f) to maintain a molar ratio of $H_2O : H_2SO_4$ of from 0.25 to 0.5, i. absorbing the remaining part of the gaseous silicon tetrafluoride from step (f) into a fluorosilicic acid solution, thereby forming a more concentrated fluorosilicic acid solution and precipitating silica, and j. separating the precipitated silica from step (i), from said concentrated fluorosilicic acid solution by filtration and introducing the filtered fluorosilicic acid solution into step (a).

2. A process according to claim 1 wherein the gaseous stream after partial drying in step (e) contains steam and hydrogen fluoride in a molar ratio $H_2O : HF$ of from 0.1 to 0.3.

* * * * *